United States Patent [19]

Pelto et al.

[11] Patent Number: 4,697,960
[45] Date of Patent: Oct. 6, 1987

[54] METHOD AND APPARATUS FOR ANCHORING ROCK BOLTS AND CABLES

[75] Inventors: Elmer M. Pelto; Allan Pearson, both of Kimberley, Canada

[73] Assignee: Cominco Ltd., Vancouver, Canada

[21] Appl. No.: 739,651

[22] Filed: May 31, 1985

[51] Int. Cl.⁴ .............................................. E21D 20/02
[52] U.S. Cl. ...................... 405/260; 366/10; 405/269
[58] Field of Search ............... 405/303, 260, 266, 267, 405/269, 240; 366/3, 5, 10, 11

[56] References Cited

U.S. PATENT DOCUMENTS

| | | | |
|---|---|---|---|
| 3,227,426 | 1/1966 | Williams | 366/51 |
| 3,363,422 | 1/1968 | Turzillo | 405/260 |
| 3,371,494 | 3/1968 | Lagerström | 405/260 |
| 3,604,213 | 9/1971 | Parsons | 405/263 |
| 4,116,368 | 9/1978 | Smith | 405/260 |
| 4,126,009 | 9/1978 | Tomic | 166/293 |
| 4,179,861 | 12/1979 | Brown | 405/261 |
| 4,326,560 | 4/1982 | Drudy | 366/10 |
| 4,390,281 | 6/1983 | Scriminger | 366/3 |
| 4,498,817 | 2/1985 | Oulsnam | 405/260 |

OTHER PUBLICATIONS

Concrete Manual, U.S. Department of the Interior, Eighth Edition, 1981, 12 pages.

Primary Examiner—David H. Corbin
Attorney, Agent, or Firm—Arne I. Fors; Robert F. Delbridge

[57] ABSTRACT

A method and apparatus for anchoring rock bolts and cables in drill holes is disclosed. The method of the invention comprises mixing a dry aggregate-cement mixture with a limited, predetermined amount of water in a water fitting and blowing the wetted cementitious mixture through a delivery tube into a drill hole, in which an anchor cable or rock bolt has been inserted, resulting in the cable or bolt becoming permanently anchored in the drill hole. The use of a wetted dry cementitious mixture eliminates leakage of mixture from the drill hole and obviates the use of a plug, cover or collar plate.

The equipement includes a pressurized, dry mix delivery vessel, a source of pressurized air, a water fitting for wetting dry mix with water and a delivery tube for delivery of the wetted dry mix into the drill hole.

12 Claims, 3 Drawing Figures

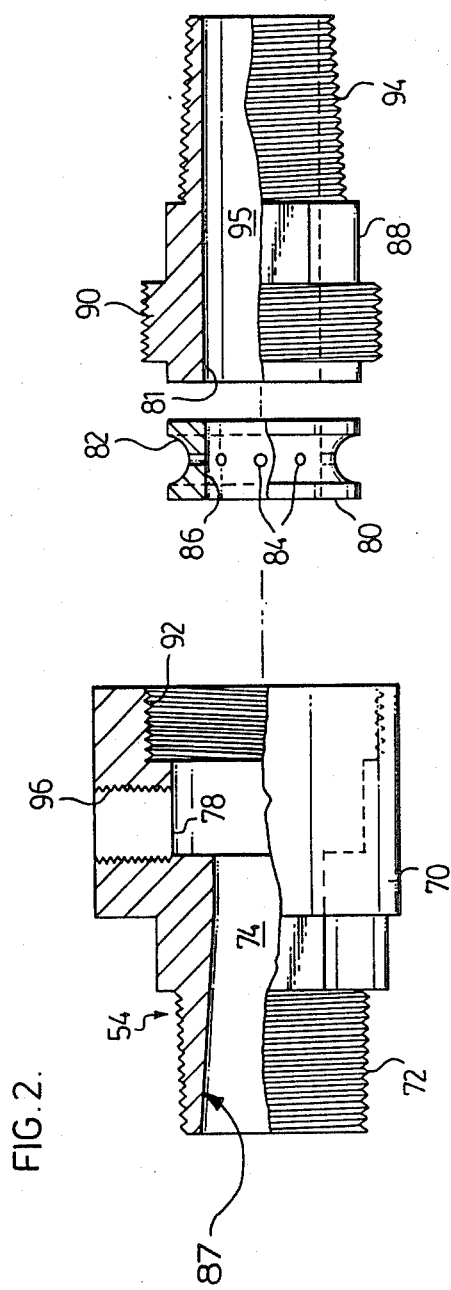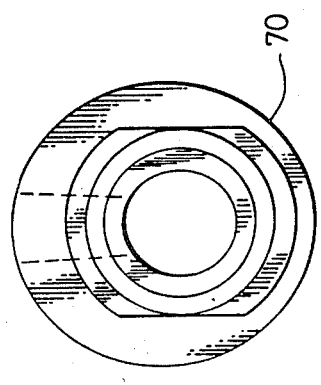

METHOD AND APPARATUS FOR ANCHORING ROCK BOLTS AND CABLES

BACKGROUND OF THE INVENTION

This invention relates to the anchoring of rock bolts and cables and, more particularly, relates to a method and apparatus for permanently anchoring ground anchor cables and rock bolts in drill holes in rock.

Anchor cables, tie rods and rock bolts have long been used as anchoring elements to strengthen or stabilize mine roofs. Such anchoring elements may be a length of wire or cable, reinforcing bar, or may be rock bolts of various shapes, configurations and sizes.

In order to improve the contact between the anchoring elements and the mine roof, the elements are often fixed or anchored in the drill holes at their inner ends or over substantially their entire lengths. In one method of fixing bolts and cables, the anchoring is achieved by means of a reactive composition which hardens around the anchoring element. For mine roof supports, compositions are needed which harden and rapidly attain maximum strength. Compositions which have been used in the past include inorganic cement compositions, grouts and synthetic resins which have been introduced into drill holes through a feed pipe, or in cartridged form.

In the case of inorganic cement compositions, a prepared hydraulic cement mortar is pumped as a slurry from a container into a drill hole after the anchoring element has been placed in the hole. Alternatively, the element can be driven into the hole filled with mortar which has been pumped in or has been placed in the hole in cartridges.

Various methods and apparatus for anchoring rock bolts and cables in drill holes in mine roofs using inorganic cement compositions are described in U.S. Pat. Nos. 2,233,872, 2,313,310, 2,667,037, 2,930,199, 3,108,422, 3,227,426, 3,326,004, 3,363,422, 3,371,494, 3,436,923, 3,494,134, 3,572,956, 3,604,213, 3,735,541, 3,986,536, 4,126,009, 4,179,861, 4,229,122, 4,252,474, and 4,289,427.

The prior art methods and apparatus have a number of disadvantages. The inorganic cement composition or grout is usually prepared as a slurry which is kept in a container prior to being pumped into the drill hole. The prepared mixture must be agitated and must be pumpable, and thus contains a relatively large quantity of water. This large amount of water requires that the injected material, once injected, must be prevented from escaping from the drill hole by means of a plug, cover or collar plate. The prepared mixture must not be allowed to set in the container, thereby limiting the amount that can be prepared to that which can be used within a short period of time. The same limitations apply when a cement slurry and water of hydration are mixed just prior to injection, or are mixed in the drill hole. Cables and bolts which are fixed in drill holes with grout frequently have a bond with the surrounding earth or mine roof which is friable and which can break down with vibrations such as caused by drilling and blasting. In addition to these disadvantages, the equipment for preparing, storing and injecting the cement compositions is relatively elaborate and thus expensive.

In distinction to these "wet methods", U.S. Pat. No. 4,498,817 discloses the use of a grit moistened with water.

This method has the disadvantage of providing only a mechanical bond, of requiring the installation of a plate to prevent particulate material from falling from the drill hole, and of settling of the material with time and vibration requiring regular tightening of the roof bolts.

SUMMARY OF THE INVENTION

We have now found that these disadvantages can be overcome or alleviated by the method and apparatus of the present invention, resulting in a less expensive, more efficient method for rapidly and permanently installing rock bolts and anchoring cables. The method according to the invention is faster and also results in bonds stronger than achieved with many of the prior art methods. The total cost of an anchoring element installed according to the invention is 30 to 90% of that of other known elements. The equipment for preparing and injecting the cementitious composition is simple and inexpensive.

More specifically, the method of the invention comprises mixing a dry aggregate-cement mixture with a limited, predetermined amount of water in a water fitting and blowing the wetted cementitious mixture through a delivery tube into a drill hole, in which an anchor cable or rock bolt has been inserted, resulting in the cable or bolt becoming permanently anchored in the drill hole. The use of a wetted dry cementitious mixture eliminates leakage of mixture from the drill hole and obviates the use of a plug, cover or collar plate. The equipment conveniently includes a pressurized, dry mix delivery vessel, a source of pressurized air, a water fitting for wetting dry mix with water and a delivery tube for delivery of the wetted dry mix into the drill hole.

It is an object of the present invention to provide a method for rapidly and permanently installing anchor cables and rock bolts.

It is another object to provide a method for installing anchor cables and rock bolts which includes blowing a substantially dry cementitious composition around an anchor cable or rock bolt in a drill hole.

It is a further object to provide an apparatus for permanently and rapidly installing anchor cables and rock bolts by means of blowing a wetted, dry aggregate-cement mixture into drill holes.

In accordance with these and other objects of the present invention, to be described in detail hereinafter, there is provided a method for permanently installing anchor cables and rock bolts in drill holes, which method comprises conducting a dry mix of an aggregate mixture and cement under pressure to a water fitting, wetting said dry mix at said water fitting with a limited, predetermined quantity of water, to provide a wetted dry mix, said quantity of water being sufficient to permit the hardening of said wetted dry mix but insufficient to allow said wetted dry mix to flow from a drill hole, passing said wetted dry mix from the water fitting under pressure through a delivery means, blowing substantially uniformly wetted dry mix from said delivery means into a drill hole having a space defined by the wall of the drill hole and containing an anchor cable or rock bolt so that the wetted dry mix fills the space between the anchor cable or rock bolt and the wall of the drill hole, and withdrawing the delivery means while filling said space. Preferably, the aggregate mixture consists of particles smaller than about 6.5 mm. Preferably, said quantity of water is in the range of about 4% to 14% by weight of said dry mix.

A further aspect of the invention comprises an apparatus for permanently installing anchor cables and rock bolts in drill holes which apparatus comprises a pressure vessel for containing dry mix; means to supply a source of pressurized air to said vessel; a dry mix conduit; delivery means extending from said dry mix conduit; means for passing dry mix in a controlled manner under pressure from said vessel into one end of said dry mix conduit; a water fitting in communication with one of said dry mix conduit or delivery means downstream from said one end of said dry mix conduit and being operable to receive said dry mix under pressure and to add water to said dry mix; means connected to said water fitting for supplying a limited, predetermined quantity of water, said water substantially uniformly wetting said dry mix prior to said wetted dry mix leaving said delivery means; said delivery means being operable to deliver substantially uniformly wetted dry mix into said drill hole.

Said means to supply a source of pressurized air to said vessel comprise an inlet in said vessel for connecting means to supply pressurized air from a source of pressurized air to said vessel. Preferably, a vibrator is attached to said vessel to ensure uninterrupted passing of dry mix from said vessel.

BRIEF DESCRIPTION OF THE DRAWING

This invention will now be described in detail, by way of example, with reference to the accompanying drawings, in which:

FIG. 2 is an exploded perspective of the water fitting shown in FIG. 1; and

FIG. 3 is an end elevation of the said water fitting from the left as viewed in FIG. 2 showing the components in assembled form.

DESCRIPTION OF THE PREFERRED EMBODIMENT

Figure 1:
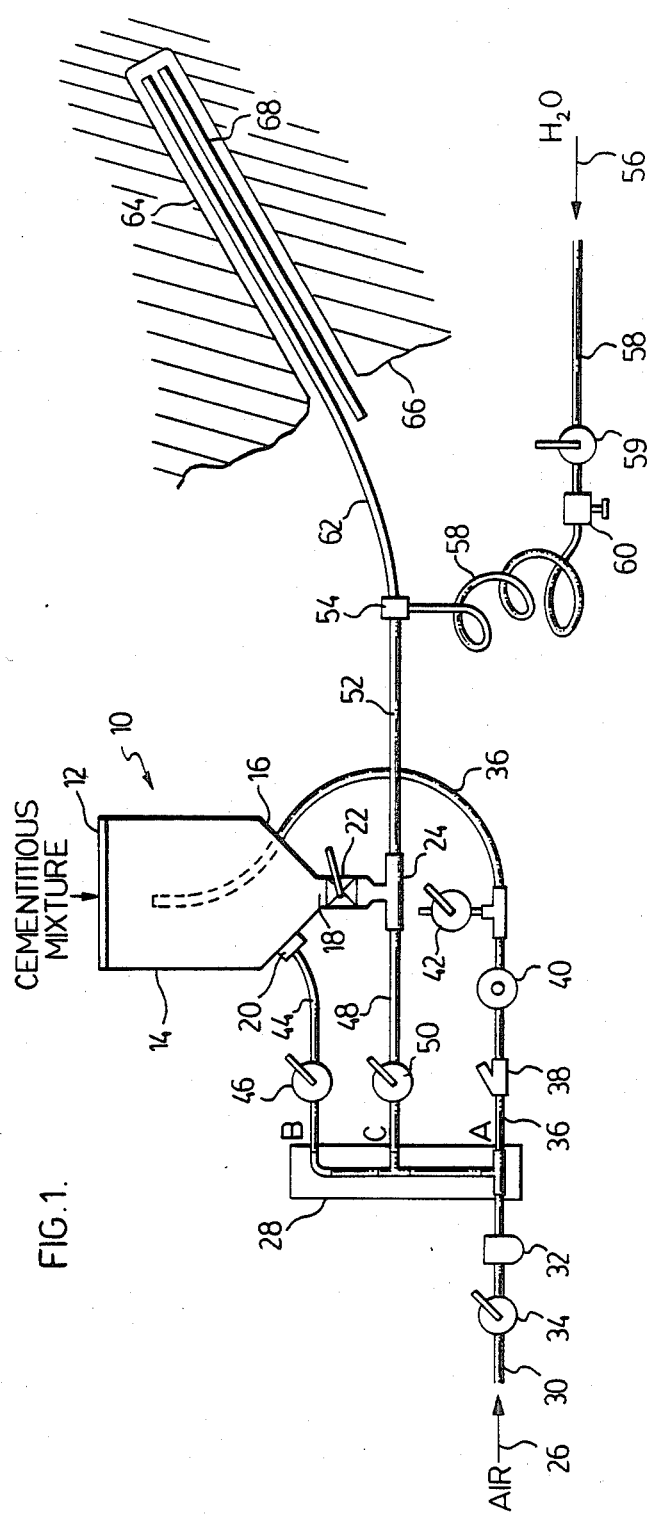
FIG. 1 is a schematic illustration of the apparatus of the invention.

With reference now to FIG. 1 of the drawings, the apparatus comprises a dry mix pressure vessel, generally indicated at 10.

Dry mix pressure vessel 10 has a cover 12 and a main body 14 with a conically-shaped bottom 16 having a central outlet 18. Cover 12 is preferably provided with a sealing gasket (not shown) so that cover 12 seals onto body 14 which allows for pressurizing of vessel 10. If desired, cover 12 may be hingeably and clampably mounted on main body 14. An air-operated vibrator 20 is mounted onto the side of conically-shaped bottom 16. The vibrator 20 ensures uninterrupted passing of dry mix from vessel 10 through central outlet 18. Attached to outlet 18 is a feed control valve 22. Feed control valve 22 conveniently is a 90° on-off, butterfly-type valve. The discharge side of valve 22 is connected to a "T" 24.

Air from a source of pressurized air 26 is supplied to a manifold 28 by means of air hose 30 connected to air source 26. A separator 32 for removing water from the air and a shut-off valve 34 are positioned in series in air hose 30. Connected to manifold 28 at A is an air hose 36, which is connected into bottom 16 of vessel 10. Positioned in air hose 36 are a strainer 38 and a pressure reducing valve 40. A pressure relief valve 42 is connected to air hose 36 to enable the release of pressure from vessel 10. Connected to manifold 28 at B is vibrator air hose 44 which is connected at its other end to vibrator 20. The amount of air supplied to vibrator 20 can be regulated by control valve 46 in hose 44. Connected to manifold 28 at C is a booster airline 48, which is connected at its other end to "T" 24. The amount of air to "T" 24 can be regulated with booster air control valve 50 in airline 48. Air from booster airline 48 conducts dry mix entering "T" 24 from vessel 10 through feed control valve 22 into and through dry mix conduit 52. Conduit 52 is conveniently a flexible hose.

Connected to dry mix conduit 52 is a water fitting 54. Water fitting 54 is adapted to wet the dry mix with a limited, predetermined quantity of water. With reference to FIGS. 2 and 3, water fittings 54 comprises a housing 70 having a threaded inlet 72 connected to conduit 52 and a tapered passage 74 coaxial with inlet 72. Housing 70 has an enlarged section 78 adapted to receive water ring 80 having a peripheral groove 82 communicating with the interior of ring 80 through equispaced radial holes 84. The interior wall 86 of ring 80 is cylindrical with the same diameter as the interior portion of passage 74. Enlarged section 78 contains a radial threaded opening 96.

Plug 88 has an external thread 90 adapted to engage internal thread 92 of housing 70 whereby threading of plug 88 into housing 70 secures ring 80 in enlarged section 78. The wall 81 of central passage 95 in plug 88 is concentric with interior wall 86 of ring member whereby a continuous substantially cylindrical passage is formed through water fitting 54 having an initial decreasing taper of about 5° to the axis of the passage to provide a venturi 87 for reasons which will become apparent as the description proceeds. The threaded outlet 94 of plug 88 is connected to delivery means 62. Water is supplied under pressure from a source 56 to the water ring 80 at threaded opening 96 through water supply hose 58 which is provided with a water shut-off valve 59 and a water control valve 60 in series. Water from hose 58 is injected into the dry mix through the plurality of openings 84 provided in the water ring, thereby uniformly wetting the dry mix.

Wetted dry mix is directed, by the air pressure in water fitting 54, from water fitting 54 through flexible delivery means 62 into drill hole 64 drilled into mineface 66. Delivery means 62 is preferably a flexible plastic or rubber tube strong enough to resist kinking. Drill hole 64 has positioned therein an anchor cable or rock bolt 68. Delivery means 62 may be inserted in the drill hole 64 over the anchor cable or next to the anchor cable or rock bolt. The diameter of the drill hole 64 is such that the space in the drill hole between the anchor cable or rock bolt and drill hole sidewall is sufficient to allow insertion of delivery means 62.

The apparatus can be conveniently mounted on wheels (not shown) to allow for easy movement along the mine face.

According to the method of the invention, as exemplified below, dry mix vessel 10 is filled with a dry mix of cementitious composition. The dry mix consists of an aggregate mixture and cement. The aggregate mixture comprises sand and gravel having a range of particle sizes. For best results, the largest particle size should be smaller than about 6.5 mm. For example, suitable aggregate mixtures may have the following screen analyses (U.S. standard sieve series): 95–100% passing No. 3 sieve, 75–85% passing No. 4, 50–70% passing No. 8, 35–55% passing No. 16, 20–35% passing No. 30, 8–20% passing No. 50 and 3–10% passing No. 100. The cement is a suitable grade of Portland cement, such as, for example, No. 50 Portland cement. The dry mix should contain about 80% by weight of aggregate mixture and about 20% by weight of Portland cement. If desired, one or more additives or accelerators may be added. For example, the addition of an accelerator mixture available under the trademark "Scamper No. 16" in an amount of about 1 to 6% by weight of the cement gave excellent results.

Vessel 10 is closed with cover 12 and pressurized with air from air hose 36 by opening shut-off valve 34 admitting air from source 26, usually at 80 to 90 psi, through air hose 30 to pressure reducing valve 40. Pressure reducing valve 40 is adjusted to provide an air pressure of about 40 psi in vessel 10. Delivery means 62 is inserted as far as possible in a drill hole in which an anchor cable or rock bolt has been positioned. Water shut-off valve 59 is opened. Booster air control valve 50 in booster airline 48 is opened to the desired setting, i.e., to give a booster air pressure in the range of about 30 to 90 psi, preferably about 60 psi. Feed control valve 22 is opened and then the vibrator 20 is started by opening vibrator control valve 46. Dry mix passes from vessel 10 through valve 22 into "T" 24 wherefrom it is conducted by the booster air through dry mix conduit 52 through water fitting 54. Immediately after starting the vibrator and almost simultaneous with opening booster air control valve 50, water is admitted to water fitting 54 from water hose 58 by opening water control valve 60 to a predetermined degree. A controlled, limited, predetermined quantity of water is injected under a pressure in the range of about 50 to 120 psi, preferably at about 50 psi, radially inwardly through holes 84 into the flow of dry mix carried by accelerated low-pressure booster air passing through venturi 87 of water fitting 54, thereby wetting the dry mix. The quantity of injected water is carefully controlled with water control valve 60 to produce a wetted dry mix which contains water in the range of about 4% to 14% by weight of dry mix passing through dry mix conduit 52. Amounts of water in this range allow the wetted dry mixes to be blown into drill holes. Less than about 4% water will not adequately wet the dry mix, while more than about 14% will cause some water and cement to exude from the wetted dry mix. Preferably, the wetted dry mix contains about 9% water by weight. Water contents between about 4% and 14% are sufficient to allow hardening or setting of the wet dry mix, but are insufficient to allow wetted dry mix to flow from the drill holes.

The controls for regulating air and water pressures are adjusted in a manner such that no backflow of material occurs in the apparatus. Wetted dry mix is conducted under pressure through delivery means 62 into drill hole 64. As the wetted dry mix fills the drill hole, the delivery means 62 is retracted at a rate such that the space between the anchor or bolt and drill hole wall is completely filled and such that the delivery means 62 does not become plugged or jammed. When the drill hole is completely filled, the feed, air and water controls are shut off, the delivery means is inserted in the next drill hole and the anchoring procedure is repeated without a waiting period between installations. The wetted dry mix sets with time into a hard non-friable mass which forms a strong bond between the drill hole wall and the anchor cable or rock bolt. Dry mix pressure vessel 10 is filled with dry mix as required, of course with air pressure released through pressure relief valve 42.

The invention will now be illustrated by means of the following non-limitative examples.

EXAMPLE 1

Using a dry mix, containing 80% by weight of an aggregate mixture having a screen analysis as given hereinabove, 19.6% by weight of No. 50 Portland cement and 2% by weight of the cement of an accelerator mixture (Scamper No. 16 TM), wetted in a water ring with 9% water under 50 psi pressure, a series of 12.7 mm diameter steel anchor cables, previously inserted in 44.5 mm diameter drill holes, were installed using the above-described procedure. The wetted dry mix was blown into the hole under 50 psi pressure through a 19 mm diameter delivery hose. The installation was accomplished at an average speed of 5 cm of cable per second. No waiting period between anchoring of successive cables was necessary. In comparison, conventional grouting of anchor cables was much slower at only 1.5 cm/second, i.e., requiring about three times as much time. Moreover, the conventional grouting required capping of the drill hole, thus necessitating additional time.

EXAMPLE 2

A number of anchor cables and different types of rock bolts each of a length of 1.8 m were installed in drill holes in a mine face using the conventional method and means suitable to each bolt and the anchor cables. The conventionally installed anchor cables and rock bolts, as well as the rock bolts installed according to Example 1 of this present invention, were pulled from the drill holes. The pull forces in tonnes are given in Table I.

TABLE I

| Type of Anchoring Element (1.8 m, Installed) | Average Pull Force in Tonnes |
|---|---|
| Anchor cables according to Example 1 | — 15* |
| Swellex TM | 8–12 |
| Mark D expansion shell | 4–6 |
| Grouted Williams TM expansion bolt | 15* |
| Grouted anchor cable | 15* |
| Spilt-Set TM | 5–8 |

*After setting for 7 days

As can be seen by comparing the pull forces for the different types of anchoring elements, the anchor cables installed according to the invention have a pull force higher than that of a Swellex TM or Split-Set TM bolts and similar to that of the grouted Williams TM expansion bolt or the grouted anchor cable. Comparatively, the cost of anchor cables installed according to the invention is from about 30 to 90% of the cost of other installed anchoring elements.

It will be understood, of course, that modifications can be made in the embodiment of the invention illustrated and described herein without departing from the scope and purview of the invention as defined in the appended claims.

What we claim as new and desire to protect by Letters Patent of the United States is:

1. A method for permanently installing anchor cables and rock bolts in drill holes, which method comprises conducting a dry mix of an aggregate mixture and cement under pressure to a water fitting, wetting said dry mix at said water fitting with a limited, predetermined quantity of water, to provide a wetted dry mix, said quantity of water being sufficient to permit the hardening of said wetted dry mix but insufficient to allow said wetted dry mix to flow from a drill hole, passing said wetted dry mix from said water fitting under pressure through a delivery means, blowing substantially uniformly wetted dry mix from said delivery means into a drill hole having a space defined by the wall of the drill hole and containing an anchor cable or rock bolt so that the wetted dry mix fills the space between the anchor cable or rock bolt and the wall of the drill hole, and withdrawing the delivery means while filling said space.

2. A method according to claim 1, wherein said quantity of water is about 9% by weight of said dry mix.

3. A method as claimed in claim 1, wherein said quantity of water is in the range of about 4 to 14% by weight of said dry mix and said wetted dry mix of an aggregate mixture and cement is conducted to a water fitting under a pressure in the range of about 30 to 90 psi.

4. A method as claimed in claim 1, wherein said aggregate mixture has a particle size with a screen analyses according to U.S. standard sieve series in which 95-100% passes No. 3 sieve, 75-85% passes No. 4 sieve, 50-70% passes No. 8 sieve, 35-55% passes No. 16 sieve, 20-35% passes No. 30 sieve, 8-20% passes No. 50 sieve and 3-10% passes No. 100 sieve.

5. A method as claimed in claim 4, wherein said dry mix contains an accelerator in an amount of about 1 to 6% by weight of the cement.

6. A method according to claim 1 wherein the aggregate mixture consists of particles smaller than about 6.5 mm.

7. A method according to claim 1, wherein said quantity of water is in the range of about 4 to 14% by weight of said dry mix.

8. An apparatus for permanently installing anchor cables and rock bolts in drill holes which apparatus comprises a pressure vessel for containing a dry mix of an aggregate mixture; means to supply a source of pressurized air to said vessel; a dry mix conduit; delivery means extending from said dry mix conduit; means for passing dry mix in a controlled manner under pressure from said vessel into one end of said dry mix conduit; a water fitting in communication with one of said dry mix conduit or delivery means downstream from said one end of said dry mix conduit and being operable to receive said dry mix under pressure and to add water to said dry mix; means connected to said water fitting for supplying a limited, predetermined quantity of water, said water substantially uniformly wetting said dry mix prior to said wetted dry mix leaving said delivery means; said delivery means being operable to deliver substantially uniformly wetted dry mix into said drill hole.

9. An apparatus as claimed in claim 8, wherein means are provided to supply booster air to said dry mix conduit to conduct dry mix to the water fitting.

10. An apparatus according to claim 9 wherein a vibrator is attached to said vessel to ensure uninterrupted passing of dry mix from said vessel to the dry mix conduit.

11. An apparatus as claimed in claim 6 wherein said water fitting has a venturi formed therein for providing accelerated low-pressure air through the water fitting whereby said water fitting is adapted to receive and wet the dry mix therein.

12. An apparatus according to claim 6, 9 or 11 wherein a vibrator is attached to said vessel to ensure uninterrupted passing of dry mix from said vessel to the dry mix conduit.

* * * * *